June 23, 1942.   F. T. POWERS   2,287,271
PROCESS CAMERA
Filed Jan. 25, 1940   3 Sheets-Sheet 1
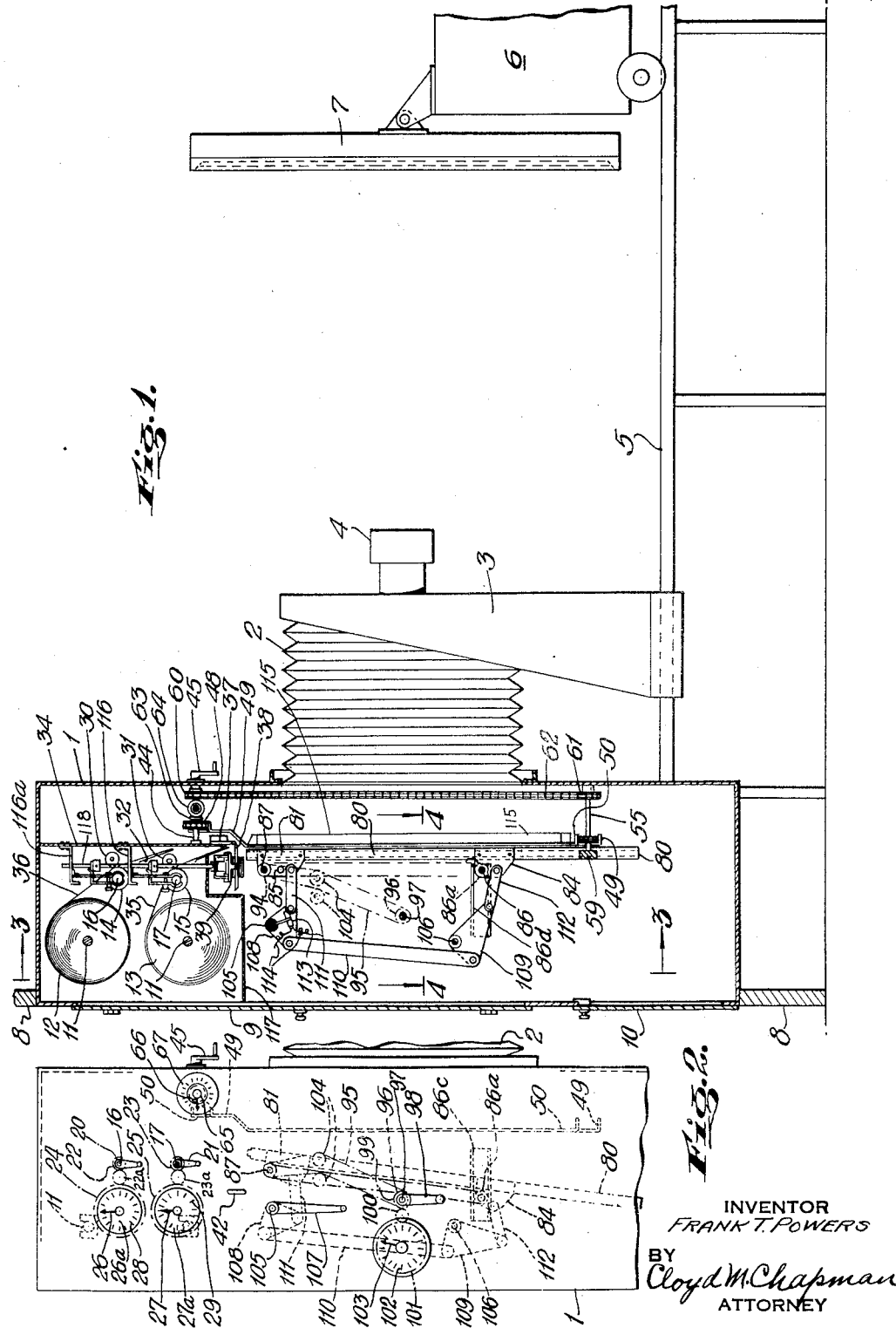
INVENTOR
FRANK T. POWERS
BY
Cloyd M. Chapman
ATTORNEY

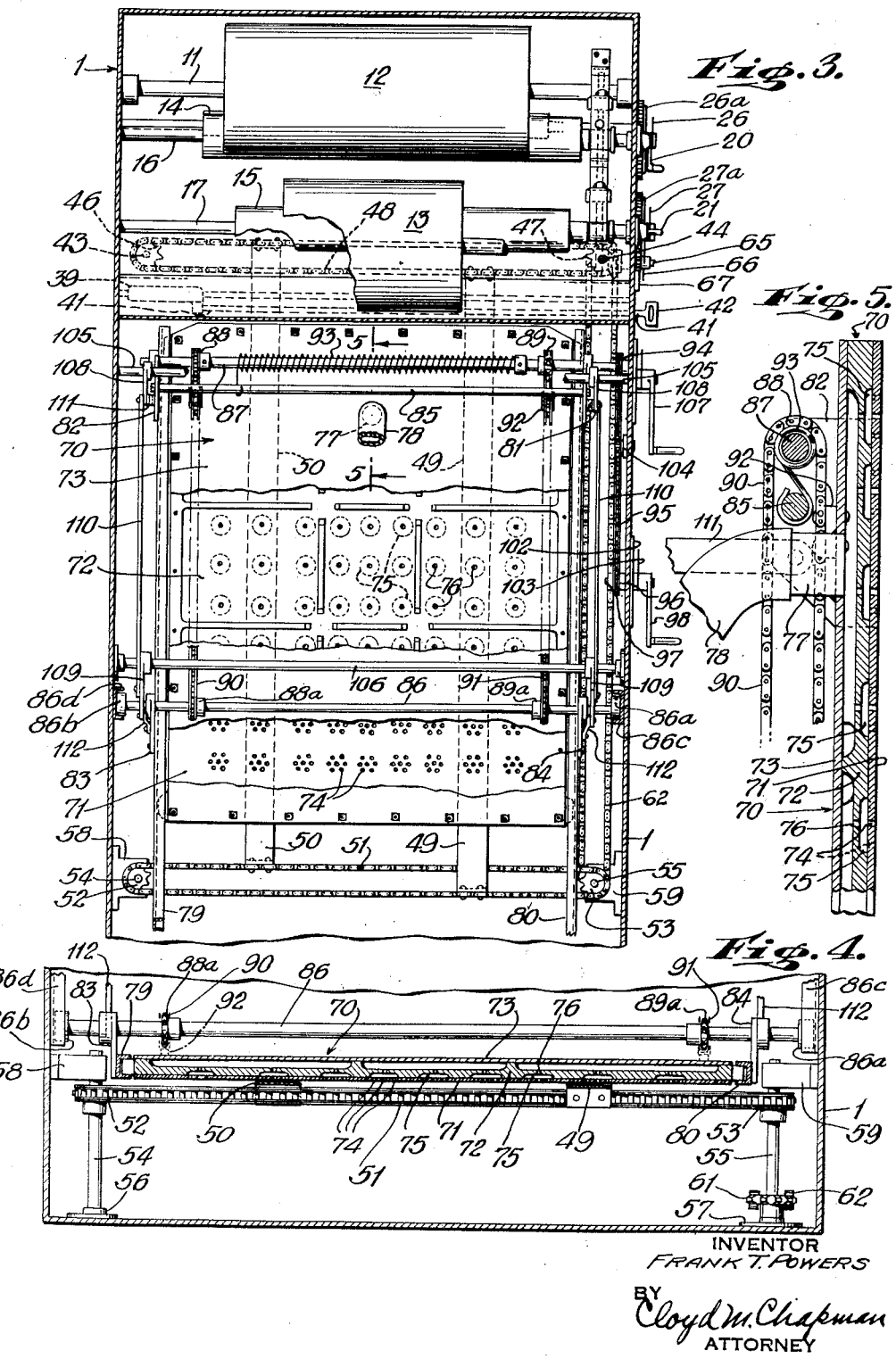

June 23, 1942.  F. T. POWERS  2,287,271
PROCESS CAMERA
Filed Jan. 25, 1940   3 Sheets-Sheet 3

INVENTOR
FRANK T. POWERS
BY
Lloyd M. Chapman
ATTORNEY

Patented June 23, 1942

2,287,271

UNITED STATES PATENT OFFICE 2,287,271

PROCESS CAMERA

Frank T. Powers, Glen Cove, N. Y.

Application January 25, 1940, Serial No. 315,519

19 Claims. (Cl. 95—34)

My invention relates to process cameras of the type which utilizes a flexible membranous light sensitive material supplied in rolls and more particularly to devices for positioning and holding light sensitive flexible membranes in the image field of the camera.

Among the objects of my invention is the providing of mechanism for supporting a severed portion of a strip of light sensitive membrane such as the strip film which is used in the making of negatives in the production of photo-mechanical printing plates.

Another object is to provide means for supporting such a membrane in the focal plane of the camera without the use of a plate of glass, or other transparent material, interposed between the light sensitive membrane and the lens of the camera.

Another object is to provide a means whereby the severing of portions of light sensitive material from the source of supply is accomplished without the production of an uneven edge or the fraying of edge or the detachment of small particles from the cut edge.

Other objects and advantages of the invention will be evident from the following description or may be learned and attained by the practice of the invention by one skilled in the art to which it pertains, the same being realized and attained by means of the instrumentalities and combinations pointed out in the appended claims.

The invention consists in the novel and improved constructions, parts, mechanisms, and features and their arrangements which are herein shown and described.

In the exemplary embodiment of the drawings, the invention is shown as applied to a process camera of the type used for copying or for making halftone or line negatives in the photoengraving art, but its use may also be advantageous in connection with other types of cameras and in other applications.

The present invention is allied with and is a continuation of, and further improvement over, my invention described in my copending application, Serial Number 315,654 of Feb. 20, 1940, filed simultaneously herewith, which provides other means for attaining some of the advantages of the present invention.

The accompanying drawings illustrate an embodiment of the invention and, taken together with the description, serve to explain the invention so that one skilled in the art may make and use the same. The embodiment shown and described herein is intended to be illustrative but not restrictive of the invention which may be embodied in various modifications of, or deviations from, the form shown and described without departing from the spirit thereof, as defined in the appended claims.

Of the drawings:

Fig. 1 is side view, partly in section, of a process camera embodying the invention.

Fig. 2 is a side view of a portion of the camera box, showing platen in a retracted position.

Fig. 3 is a rear view of the mechanism of the invention within the camera box, with back of the box removed.

Fig. 4 is partial horizontal section in plane 4—4 of Fig. 1.

Fig. 5 is an enlarged detail of a portion of the platen in vertical section on the line 5—5 of Fig. 3.

Figure 6:
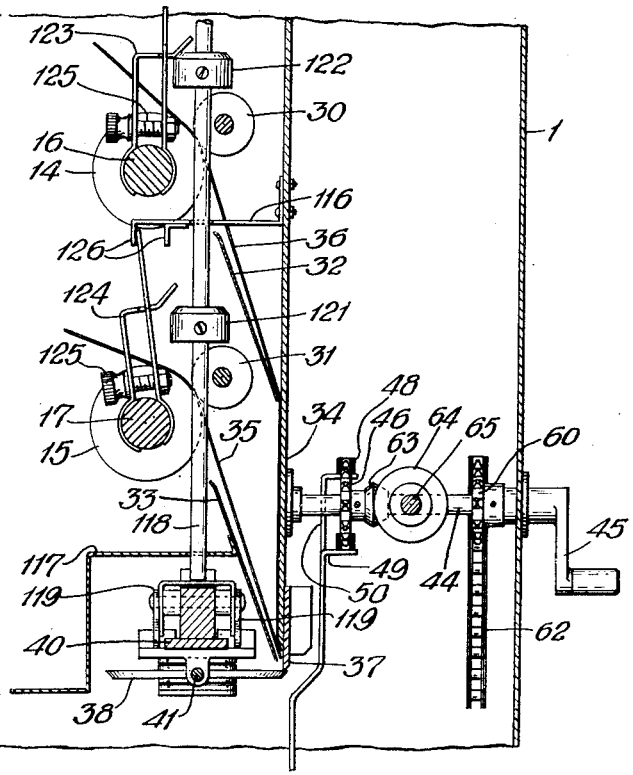
Fig. 6 is an enlarged side view detail of the film retracting device.

In the following description the several assemblies of parts and devices which make up the whole are grouped under headings:

The camera

In Fig. 1 there is shown the conventional parts of a process camera which is arranged for operation in connection with a dark room and having the rear of the camera box set in an opening in a wall of the dark room and with the rear of the camera box opening into the dark room.

The conventional parts consist of a camera box 1 attached to the front of which is a bellows 2 connected to a lens support 3 which carries lens 4 and is slidable along rails 5 which also supports a carriage 6 also movable along the rails 5 and which supports a tiltable copy holder 7.

The camera box 1 is customarily set in an opening in a wall 8 of the dark room and is provided with an upper door 9, giving access from within the dark room to the mechanisms and supports for rolls of light sensitive film hereinafter called film, within the upper portion of the camera box, thus permitting rolls of film to be inserted or withdrawn without the possibility of exposure to light. There is a lower door 10 also giving access from within the dark room to the lower compartment of the camera box for the removal of exposed and severed portions of film, as will be more fully described hereinafter.

Film supply and measuring

Within the camera box 1, on either side wall, are journals adapted to receive shafts 11 which support strips of film in the form of rolls 12 and 13 which constitute the sources of supply referred to in this description and in the claims. These strips of film are of such predetermined widths as, for the nature and size of the work to be done, may be most advantageous and economical. They are placed and held centered on the shafts. Measuring rollers 14 and 15 are mounted on shafts 16 and 17 rotatable in bearings 18 and 19 mounted on sides of camera box. The shafts 16 and 17 project through one side of the camera box and are provided with crank handles 20 and 21 and also with small gears 22 and 23 which mesh through idler pinions 22a and 23a with gears 24 and 25 attached by frictional sleeve to pointers 26 and 27 cooperating with dials 26a and 27a upon which are markings 28 and 29 indicating the length of film turned down, as will be more fully described hereinafter. Adjacent to measuring rollers 14 and 15 and in pressure contact thereon, are rollers 30 and 31 having shafts which are suitably journalled at the sides of the camera box. These pressure rollers prevent slipping of the film on the measuring rolls.

Cutting film

Extending across the interior of the camera box, from side to side, are inclined guide plates 32 and 33 so spaced in relation to the plate 34 as to permit the passage of, and to guide the movement of, strips 35 and 36 of film from the supply rolls 14 and 15 to the image-receiving area of the camera. Extending across the camera box and projecting below the bottom edge of the plate 34 is a knife bar 37. Below this bar and in pressure contact with the lower edge thereof, is a disc knife 38, rotatably mounted on a carriage assembly 39 adapted to slide along bar 40. To this knife carriage assembly is attached a rod 41 extending through one of the sides thereof and provided with a handle 42 exterior of the camera, whereby the knife 38 may be drawn along the edge of the bar 37 to sever that portion of either of the strips of film 35 or 36, which extends below the edge of the bar 37.

Film guides

Between front of the plate 34 and the front of the camera box 1 are mounted two shafts 43 and 44, one of which, 44, extends through the front and is provided with a crank handle 45. On shafts 43 and 44 are sprocket wheels 46 and 47 respectively, engaging sprocket chain 48, to the lower and upper runs of which are attached two thin metal guides 49 and 50, extending downwardly and attached to the lower and upper runs of chain 51 which engages sprocket wheels 52 and 53 mounted on shafts 54 and 55 journalled in bearings 56, 57, 58 and 59, attached to the front and sides of the camera box. On shaft 44 is mounted a sprocket wheel 60 and on shaft 55 is mounted sprocket wheel 61 both of which sprocket wheels 60 and 61 engage chain 62. On shaft 44 is also mounted a bevel gear 63 which engages bevel gear 64, connected by means of shaft 65 and suitable bearing, with the pointer 66 which travels over dial 67 suitably marked to indicate the lateral position or distance apart of guides 49 and 50. This distance must be a little less than the width of the film turned down.

Platen

The platen 70 is composed of a forward surface plate 71 preferably of smooth resilient material, an intermediate layer 72 and a rear surface layer 73. The forward layer 71 which is toward the camera lens, and at the time of exposure is adjacent and parallel to the focal plane of the lens, may be perforated by many small holes which may be in clusters 74, spaced over substantially the entire area of the platen. The intermediate layer 72 of the platen is provided with shallow cavities 75 on its front side adjacent to each cluster of holes in the front layer 71. The rear side of the intermediate layer 72 is also provided with shallow cavities connected by passages 76 with each of the cavities 75 and connected with each other.

The rear surface layer 73 of the platen is provided with a connection 77 for a flexible tube or hose 78 leading to an electric motor driven air pump of any suitable type, herein called an exhauster, capable of maintaining a suitable vacuum in the system, (not shown in the drawings). Thus all clusters of holes in the front plate are connected by air passages to the tube 78.

Platen retractor

This platen assembly is provided with means for moving its front surface into the focal plane of the lens of the camera and to retract it toward the rear, away from the focal plane and also with means for moving it in a vertical direction, as follows:

A pair of channels 79 and 80 are located one on each side of the platen 70 and adapted to engage the vertical sides of the platen. These channels are held in a fixed position relative to each other by plates 81, 82, 83 and 84 in conjunction with tie rods 85 and 86. On the ends of the rod 86 are mounted wheels 86a and 86b which are adapted to travel horizontally between the flanges of, and to bear on the lower flanges of, the angles 86c and 86d which are attached to the sides of the camera box 1. Plates 81 and 82 also provide support for bearings carrying shaft 87 upon which are mounted sprocket wheels 88 and 89, and plates 83 and 84 provide support for bearings for shaft 86 upon which are mounted sprocket wheels 88a and 89a. Sprocket wheels 88 and 88a engage chain 90 and sprocket wheels 89 and 89a engage chain 91. Chains 90 and 91 are attached to brackets 92 attached to the back of platen 70.

Platen elevator

A coil spring 93 surrounds shaft 87 with one end anchored to the shaft 87 and the other end to a tie rod 85, and serves as a spring counterbalance to the weight of the platen 70 as it is raised and lowered guided by the channels 79 and 80 as will be hereinafter described. Shaft 87 also carries sprocket wheel 94 which engages a sprocket chain 95 which connects sprocket wheel 94 with sprocket wheel 96 on stub shaft 97 journalled in the side of the camera box and provided with a crank handle 98 on the outside of the camera box. By the manipulation of this crank the platen may be raised and lowered to any desired position within the limits of its movement. On the stub shaft 97 is also a small gear 99 which meshes with a small intermediate gear 100 which in turn meshes with a gear 101 which operates a dial 102 and pointer 103 mechanism graduated to show the vertical position of the platen. Sprocket chain idlers 104 take up the slack in chain 95 as the position of the platen is altered as presently described.

Shafts 105 and 106 extend across the camera box and are journalled on its sides. Shaft 105 extends through one side of the box and is provided with a lever handle 107. Attached to shaft 105 are two similar rocker arm plates 108 and on shaft 106 are two similar rocker arm plates 109 having one arm greater than the corresponding arm of rocker plate, 108. Rocker arm 108 and 109 are connected by links 110. Rocker arms 108 are connected by links 111 with plates 81 and rocker arms 109 are connected to plates 84 by links 112. Movement of the lever 107 moves the platen between the positions shown in Figs. 1 and 2.

Switch

Attached to one of plates 108 is a mercury tilting switch 113 so adjusted as to close an electric circuit when the platen 70 is moved to its forward position as shown in Fig. 1 and to open the circuit when the platen is moved to its retracted position shown in Fig. 2. Conductors 114 lead to a motor, not shown, which drives an exhauster, not shown, as presently described.

In front of the focal plane of the camera and also in front of guides 49 is a frame 115 adapted to receive and hold a line screen when the camera is used for making half tone negatives.

Film retractor

Figure 7:
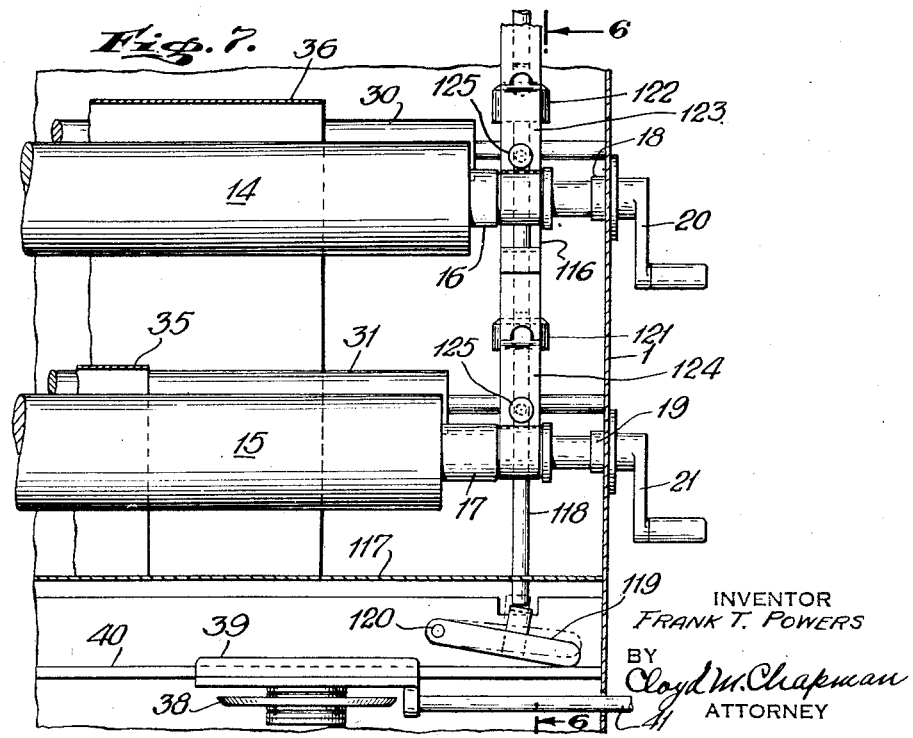
Fig. 7 is a rear view of the film retracting device.

To prevent fraying and the production of lint along the edge of the cut film by the movement of the rotary knife 38 a device shown in detail in Figs. 6 and 7 is provided as follows: Openings in brackets 116, 116a and 117 provide guides for rod 118 which engages at its lower end a double lever 119 held by pivot 120 and adapted to be engaged by the knife carriage assembly 39 when said carriage is moved under it and lifted together with rod 118 and cam collars 121 and 122 which are positioned and adapted to engage the inclined portion of lever assemblies 123 and 124, which are clamped around shafts 16 and 17 of rollers 14 and 15 by bolts 125 thus providing frictional adjustment thereto. Stops 126 on brackets 116 and 116a limit the movement of lever assemblies 123 and 124. The action of this film retracting device is as follows: The movement of the knife carriage 39 to cut off a portion of film causes this carriage to engage levers 119 lifting rod 118 and causing cam collars 121 and 122 to engage the inclined portion of lever assemblies 123 and 124 rotating them through a small arc and, by reason of their frictional contact with shafts 16 and 17 to rotate feed rollers 14 and 15 in a counterclockwise direction and retracting the films 35 and 36 a short distance, sufficient to lift their cut ends above the lower edge of the knife blade 37 so that they are out of the way of rotating knife 38. This prevents the fraying of the ends of the film by the repeated passing of the knife 38 when successive portions of one or another of the films are cut. Once a film is retracted it remains in its retracted position until again fed down by the turning of crank 20 or 21. The method of operation is as follows:

Having placed rolls of film of the desired widths centrally on shafts 11 through door 9 opening into the dark room, the end of each roll is fed between feed rollers 14 and 15 and pressure rollers 30 and 31 respectively and down to the lower edge of knife 37 with the platen 70 in its retracted position. A small portion is trimmed off by pulling out rod 41 by means of handle 42 and causing the knife carriage 39 and rotary knife 38 to travel along the edge of knife blade 37.

The guides 49 and 50 are adjusted to a distance apart about half an inch less than the width of the film selected to be used by turning crank 45 until pointer 66 indicates on dial 67 the correct width. These guides hold the film, which may have a tendency to curl since it is unrolled from a roll, close to the surface of the platen and direct its movement down the face of the platen.

By turning either crank 20 or 21, depending on the width of film desired, until its corresponding pointer 26 or 27 indicates on dial 26a or 27a the desired length of film is turned down into the image field of the camera. By manipulating lever 107 the platen is moved from its retracted position shown in Fig. 2 to its forward position shown in Fig. 1. The guides 49 and 50 press the edges of the film against the face of the platen which is supported and guided in this movement by the wheels 86a and 86b, on tie rod 86, traveling on the lower flanges of the horizontal angles 86c and 86d. This lever movement tilts the mercury switch 113 starting the motor driving the exhauster (not shown) and drawing air from the passages 76 and cavities 75 in the platen and producing a partial vacuum therein. This suction holds the film in close contact with the front true plane surface of the platen 70 and accurately in the focal plane of the camera lens. The film is then severed from the source of supply by the knife 38 by drawing out rod 41. At the end of the movement of the rod the knife carriage 39 engages levers 119 lifting rod 118 causing cams 121 and 122 to engage the lever assemblies 123 and/or 124 rotating the measuring roller shafts 16 and/or 17 through a small arc. The resulting small movement of the rollers 14 and/or 15 retracts the film a short distance so that the newly cut edge of the film is raised slightly above the edge of the stationary knife blade 37 and so safely out of the way of the rotary knife 38 when it again is passed along the stationary knife blade. This retracting of the film effectively eliminates particles of film or lint being detached from the edge of the film and falling on the face of the film, which has been a frequent source of troublesome specks and spots on the resulting picture. The retracting of the edge of the film one eighth of an inch above the knife edge is found ample. After severing and retracting the film the rod 41 is pushed back to its normal or idle position within the camera box.

The desired portion of film being now severed from the source of supply, with its top edge at the top of the image field, and being firmly held against the face of the platen by the suction of the partial vacuum created by the vacuum pump, the platen and film are moved down to the center of the image field by turning crank 98. The amount of movement is indicated by the pointer 103 on dial 102. Turning crank 98 turns shaft 87 through the intermediate action of chain 95. The coil spring 93 is adapted to counterbalance the weight of the platen so that it will remain stationary in any position when lowered to bring the center of the sheet of film to the center of the image field. The movement of the platen is guided by the channels 79 and 80, engaging wheels 86a and 86b.

The lens 4 having been focused on the copy in the copy holder 7, the required exposure is made. The platen is then retracted by manipulation of lever 107 which movement tilts the mercury switch 112 breaking the electric circuit to the motor driving the vacuum pump thus breaking the suction holding the severed portion of film to the front of the platen. The film falls into the lower compartment whence it may be removed from the camera box through the door 10 directly into the dark room for development.

In usual practice a number of exposures are made and allowed to accumulate in the lower compartment and are developed in batches.

Having described my invention in a manner enabling one skilled in the art to make and use it, I now state what I claim to be new and for which I pray that Letters Patent be granted.

I claim:

1. A camera including in combination an objective, a source of photosensitive material in strip form, means for feeding variable lengths of the material to the image field of the camera, a support for the variable length of material to be exposed, suction means including perforations on the face of the support for holding the severed material on the support, guiding means adjacent to said support and engageable with the edges of the length to be exposed to bring the length close to the support to give preliminary suction sealing contact between the material and support, means for severing the variable length of material from the remainder of the strip and means for moving the support and the severed material held thereon transversely to the axis of the objective whereby the length to be exposed may be centered with reference to the axis of the objective.

2. A camera including in combination an objective, a source of photosensitive material in strip form, means for feeding variable lengths of the material to the image field of the camera, a support for the length of material to be exposed, suction means including perforations on the face of the support and operating over substantially the entire back of the length of material for holding the severed material flat on the support, means between the support and feeding means for severing the variable length of material from the remainder of the strip and means for moving the support, and material held thereon, transversely to the axis of the objective whereby the length to be exposed may be centered with reference to the axis of the objective.

3. A camera including in combination an objective, a plurality of sources of photosensitive material in strip form, means for feeding lengths of the material selectively from one of the sources to the image field of the camera, a support in the image field for the length of material to be exposed, suction means including perforations on the face of the support for holding the severed material on the support, means between the feeding means and support for severing the length of material from the remainder of the strip and means for moving the support and material held thereon transversely to the axis of the objective whereby the length to be exposed may be centered with reference to the axis of the objective.

4. A camera including in combination an objective, a plurality of sources of photosensitive material in strip form, means for selectively feeding lengths of the material from said sources to the image field of the camera, a pivotally mounted support for the length of material to be exposed, suction means including perforations on the face of the support and controlled by the pivotal movement of the support for holding the severed material on the support, and means between the support and feeding means for severing the length of material from the remainder of the strip.

5. A camera including in combination an objective, a plurality of sources of photosensitive material of different widths in strip form, means for selectively feeding variable lengths of the material to the image field of the camera, a support for the length of the selected material to be exposed, means for guiding the length of selected material fed from the source to a position adjacent to the support, means for moving the support into the focal plane of the objective and towards said guiding means, means for severing the length of selected material from the remainder of the strip, suction means carried by the support and operating over substantially the entire area of the length of material to be exposed to hold the material on the support and in the focal plane of the objective and means for moving the support and the material held thereon transversely to the axis of the objective and relatively to the feeding means whereby the severed length of material may be centered with reference to the axis of the objective.

6. A camera including in combination an objective, a plurality of sources of photosensitive material of different widths in strip form, means for selectively feeding variable lengths of the material to the image field of the camera, a support for the length of the selected material to be exposed, means for guiding the length of selected material fed from the source to a position adjacent to the support, means for moving the support into the focal plane of the objective and towards said guiding means, means between the support and feeding means for severing the length of selected material to be exposed from the remainder of the strip, suction means carried by the support and operating over substantially the entire area of the length of material to be exposed to hold the material on the support and in the focal plane of the objective, means for moving the support, and the material held thereon transversely to the axis of the objective and relatively to the feeding means whereby the severed length of material may be centered with reference to the axis of the objective and means operated by the severing means for reversely feeding the previously fed material to move its cut end away from the severing means.

7. A camera including in combination an objective, a source of photosensitive material in strip form, means for feeding variable lengths of the material to the image field of the camera, a support for the length of material to be exposed, means for guiding the length of material fed from the source to a position adjacent to the support, means for moving the support into the focal plane of the objective and towards said guiding means, means for severing the length of material from the remainder of the strip, means carried by the support to hold the material on the support and in the focal plane of the objective and means for moving the support and the material held thereon transversely to the axis of the objective and relatively to the feeding means whereby the severed length of material may be centered with reference to the axis of the objective.

8. A camera including in combination an objective, a source of photosensitive material of different widths in strip form, means for selectively feeding variable lengths of the material to the image field of the camera, a pivotally movable support for the length of the selected material to be exposed, laterally movable means engageable with the side edges of the fed material for guiding the length of selected material fed from the source to a position adjacent to the support, means for moving the support into the focal plane of the objective and towards said guiding means, means for severing the length of selected material from the remainder of the strip, suction means carried by the support and operating over substantially the entire area of the length of material to be exposed to hold the material on the support and in the focal plane of the objective, means controlled by the pivotal movement of the support for energizing the suction means when the support is in the focal plane and means for moving the support and the material held thereon transversely to the axis of the objective whereby the severed length of material may be centered with reference to the axis of the objective.

9. A camera including in combination an objective, a plurality of sources of photosensitive material in strip form, means for selectively feeding lengths of the material to the image field of the camera, a support movable toward and from the objective for the length of the selected material to be exposed, means for guiding the length of selected material fed from the source to a position adjacent to the support, means for moving the support into the focal plane of the objective and towards said guiding means, means for severing the length of selected material from the remainder of the strip, suction means carried by the support and operating over substantially the entire area of the length of material to be exposed to hold the material on the support and in the focal plane of the objective and means operated by movement of the support into the focal plane for energizing said suction means.

10. A camera including in combination an objective, a plurality of sources of photosensitive material in strip form, means for selectively feeding variable lengths of material from said sources to the image field of the camera, a support for the length of selected material to be exposed, means for guiding the length of selected material fed from its source to a position adjacent to the support, means operable between the support and feeding means for severing variable lengths of selected material, means operated by the severing means for reversely feeding the material to move its cut end away from the severing means, means for holding the varied lengths of sensitive material on said support, and means for moving the support and the severed length of material transversely to the axis of the objective.

11. A camera including in combination an objective, a plurality of sources of photosensitive material in strip form, means for selectively feeding lengths of material from said sources to the image field of the camera, a support for the length of selected material to be exposed, means for guiding the length of selected material fed from its source to a position adjacent to the support, means operable between the support and feeding means for severing lengths of selected material, means operated by operation of the severing means for reversely feeding the material to move its cup end away from the severing means, suction means for holding the sensitive material on said support, and means for moving the support and the severed length of material transversely to the axis of the objective.

12. A camera including in combination an objective, a plurality of sources of photosensitive material in strip form, means for selectively feeding lengths of material from said sources to the image field of the camera, a support for the length of selected material to be exposed, means for guiding the length of selected material fed from its source to a position adjacent to the support, means operable between the support and feeding means for severing lengths of selected material, means automatically operated during each cycle of operations for reversely feeding the material to move its cut end away from the severing means and means for holding the sensitive material on said support.

13. A camera including in combination an objective, a plurality of sources of photosensitive material in strip form, means for selectively feeding lengths of material from said sources to the image field of the camera, a support having suction means operable on the back of the length of selected material to be exposed for holding the material flat, means for guiding the length of selected material fed from its source to a position adjacent to the support, means operable between the support and feeding means for severing lengths of selected material, means automatically operated after the feeding and severing operations for reversely feeding the material to move its end away from the severing means, and means for moving the support and the severed length of material transversely to the axis of the objective.

14. A camera including in combination an objective, a plurality of sources of photosensitive material of different widths in strip form, means for selectively feeding lengths of material from said sources to the image field of the camera, a support for the length of the selected material to be exposed, laterally movable means for guiding the length of selected material by engagement with its edges as it is fed from its source to a position adjacent to the support, means operable between the support and feeding means for severing lengths of selected material, means automatically operated after the feeding and severing operations for reversely feeding the material to move its cut end away from the severing means, means for holding the sensitive material on said support, and means for moving the support and the severed length of material transversely to the axis of the objective.

15. A camera including in combination an objective, means for feeding variable lengths of photosensitive material to the image field of the camera, a support in the image field of the camera for supporting the length of material to be exposed and movable toward and from the objective, guiding means adjacent to the surface of the support nearest the objective and between which and the support the material is fed, said support including a vacuum back operating on the back of the material and extending over substantially the entire area thereof to be exposed, means for moving the supporting means transversely to the axis of the objective and relatively to the feeding means whereby the area of material to be exposed may be centered with reference to the axis of the objective and means for severing variable lengths of said material.

16. A camera including in combination an objective, a plurality of selectively operable means for feeding lengths of photosensitive material of different widths to the image field of the camera, a support in the image field of the camera for supporting the length of material to be exposed and movable toward and from the focal plane of the objective, laterally movable guiding means engageable with the edges of the fed material and adjacent to the surface of the support nearest the objective and between which and the support the material is fed, suction means including perforations on the face of the support operating on the back of the material and extending over substantially the entire area thereof to be exposed.

17. A camera including in combination an objective, means for feeding lengths of photosensitive material to the image field of the camera, a support in the image field of the camera for supporting the length of material to be exposed and movable into and out of the focal plane of the objective, guiding means adjacent to the surface of the support nearest the objective and between which and the support the material is fed, suction means including perforations on the face of the support operating on the back of the material and extending over substantially the entire area thereof to be exposed and means operated by movement of the supporting means into the focal plane of the objective to energize the suction means.

18. A camera including in combination an objective, selectively operable means for feeding variable lengths of photosensitive material of different widths to the image field of the camera, a support in the image field of the camera for supporting the length of material to be exposed and pivotally movable about its upper edge toward and from the focal plane of the objective, laterally adjustable guiding means adjacent to the surface of the support nearest the objective and between which and the support the material is fed, suction means operating on the back of the material and extending over substantially the entire area thereof to be exposed, a switch carried by said support and supplying power to the suction means, when the support is in the focal plane of the objective and means for moving the supporting means transversely to the axis of the objective and relatively to the feeding means whereby the variable lengths of material to be exposed may be centered with reference to the axis of the objective.

19. A camera including in combination an objective, selectively operable means for feeding variable lengths of photosensitive material of different widths to the image field of the camera, a support in the image field of the camera for supporting the length of material to be exposed and movable into and out of the focal plane of the objective, laterally movable guides adjacent to the surface of the support nearest the objective and between which and the support the material is fed, and suction means operating on the back of the material and extending over substantially the entire area thereof to be exposed, means for moving the supporting means relative to the feeding means and transversely to the axis of the objective whereby the area of material to be exposed may be centered with reference to the axis of the objective and severing means for severing the length of material between the support and feeding means.

FRANK T. POWERS.